United States Patent [19]
Bowers et al.

[11] Patent Number: 5,262,068
[45] Date of Patent: Nov. 16, 1993

[54] INTEGRATED SYSTEM FOR FILTERING AND DISPENSING FLUID HAVING FILL, DISPENSE AND BUBBLE PURGE STROKES

[75] Inventors: William F. Bowers, Topsfield; Stephen G. Hunt, N. Billerica, both of Mass.

[73] Assignee: Millipore Corporation, Bedford, Mass.

[21] Appl. No.: 703,148

[22] Filed: May 17, 1991

[51] Int. Cl.⁵ .............................................. F04B 39/16
[52] U.S. Cl. ........................... 210/767; 210/90; 210/134; 210/188; 210/416.1; 210/472; 222/1; 222/189; 222/255; 417/199.2; 417/205; 417/384; 417/472
[58] Field of Search .............. 210/90, 416.1, 472, 210/282, 188, 258, 436, 767, 741, 791, 194; 417/313, 383–388, 394, 395, 435, 472, 473, 14, 53, 413 R; 222/189, 1, 23

[56] References Cited

U.S. PATENT DOCUMENTS

| | | | |
|---|---|---|---|
| 4,430,048 | 2/1984 | Fritsch | 417/383 |
| 4,465,438 | 8/1984 | Brauer et al. | 417/386 |
| 4,573,885 | 3/1986 | Petersen | 417/383 |
| 4,618,425 | 10/1986 | Yates | 210/416.1 |
| 4,690,621 | 9/1987 | Swain | 417/313 |
| 4,749,342 | 6/1988 | Fritsch | 417/388 |
| 4,773,831 | 9/1988 | Brauer et al. | 417/387 |
| 4,832,581 | 5/1989 | Muller et al. | 417/383 |
| 4,865,528 | 9/1989 | Fritsch et al. | 417/388 |
| 4,902,206 | 2/1990 | Nakazawa et al. | 417/473 |
| 4,915,597 | 4/1990 | Moore | 210/416.1 |
| 4,950,134 | 8/1990 | Bailey et al. | 417/383 |
| 4,983,102 | 1/1991 | Swain | 417/394 |
| 5,002,471 | 3/1991 | Perlov | 417/413 |
| 5,167,837 | 12/1992 | Snodgrass et al. | 210/416.1 |

FOREIGN PATENT DOCUMENTS

1262908 10/1989 Japan .................................. 210/436

Primary Examiner—Joseph W. Drodge
Attorney, Agent, or Firm—Hamilton, Brook, Smith & Reynolds

[57] ABSTRACT

An integrated system and method are disclosed for filtering a fluid and for dispensing a desired volume of the fluid. The integrated system includes a feed pump sub-assembly for receiving fluid and for directing the fluid through a filter. A filtration sub-assembly is joined with the feed pump sub-assembly for receiving fluid from the feed pump sub-assembly and for housing the filter. A dispense pump sub-assembly is integrally joined with the filtration sub-assembly and defines a dispense chamber for receiving filtered fluid from the filtration sub-assembly. The dispense pump sub-assembly includes a dispensing means which is moveable from a fill position to a purge position for purging at least a portion of any gas bubbles from the dispense chamber. The gas bubbles are purged through a purge outlet disposed above a fluid inlet and a fluid outlet of the dispense chamber. The dispensing means is also moveable from the purge position to a dispense position for dispensing a desired volume of the fluid from the integrated system.

22 Claims, 9 Drawing Sheets

INTEGRATED SYSTEM FOR FILTERING AND DISPENSING FLUID HAVING FILL, DISPENSE AND BUBBLE PURGE STROKES

BACKGROUND OF THE INVENTION

Manufacturing processes often require that fluids be repeatably dispensed in exact amounts. For example, production of an integrated electrical circuit can include pumping a photoresist fluid onto a suitable substrate surface, such as a metal-coated silicon wafer, which is then treated by a photolithographic process to form a selectively deposited protective mask. Portions of the wafer not protected by the protective mask are then etched, such as by chemical etching, to produce the integrated electrical circuit.

However, newer processes often require that the amount and rate of photoresist fluid disposed onto the substrate surface generally must be precise. Deposition of an uneven coating on a wafer surface, for example, can cause defects in the protective mask formed and consequent short circuiting of the resultant integrated circuit. Gas bubbles and particulates, such as gel particulates, dust and crystals within the photoresist fluid, can also cause defects in the protective mask. For example, operation of pumps to dispense photoresist fluid can reduce the photoresist fluid pressure in an amount sufficient to cause gas bubbles to form in the fluid. The bubbles can then be deposited onto the substrate surface, thereby causing defects in the protective mask subsequently formed from the photoresist fluid.

One method of dispensing a photoresist fluid on a substrate includes employing a positive displacement diaphragm pump to direct the photoresist fluid through a filter onto the substrate. However, gas bubbles often accumulate and become trapped in the pump and in the filter. Such gas bubbles can significantly diminish the quality of the protective mask formed on the substrate by becoming compressed while fluid is dispensed from the pump onto the substrate. For example, compression of gas bubbles in the pump or in the filter can significantly reduce the accuracy of the amount of fluid distributed by the pump onto the substrate by significantly diminishing the flow rate of photoresist fluid as it is dispensed onto the substrate. Diminished flow rate from the pump and filter, in turn, can cause defects in the photoresist mask formed on the substrate.

One example of such a system for dispensing fluid, is disclosed in U.S. Pat. No. 4,950,134, wherein a diaphragm is actuated by displacing a hydraulic fluid with a piston. The hydraulic fluid is sealed between the piston and the diaphragm by a sealing ring at the piston. However, the sealing ring typically will wear during movement of the piston, ultimately leading to failure of the pump or leakage of the hydraulic fluid and consequent variability or inaccuracy of the amount of fluid dispensed from the pump. Also, gas trapped within the system or within a filter through which the fluid is pumped can cause the amount of fluid dispensed to vary significantly.

Therefore, a need exists for a new system and method of filtering and dispensing fluids which overcome or minimize the above-mentioned problems.

SUMMARY OF THE INVENTION

The present invention relates to a new integrated system and method for filtering a fluid and for dispensing a desired volume of the fluid.

The integrated system includes a filtration sub-assembly for housing a filter, the filtration sub-assembly having an inlet, for receiving fluid from a feed pump, and an outlet. A dispense pump sub-assembly is integrally joined with the filtration sub-assembly and defines a filtered-fluid chamber for receiving filtered fluid from the filtration sub-assembly. The dispense pump sub-assembly includes a fluid inlet, a fluid outlet, a purge outlet disposed above the fluid inlet and the fluid outlet, and a dispensing means. The dispensing means is moveable from a fill position to a purge position for purging a portion of any gas bubbles in the filtered fluid chamber through the purge outlet, and is moveable from the purge position to a dispense position for dispensing a desired volume of the fluid through the fluid outlet and out of the integrated system.

The integrated method includes directing a fluid from a fluid source through a filter disposed in a filtration sub-assembly and to a dispense pump sub-assembly which is integrally joined with the filtration sub-assembly, whereby the dispense pump sub-assembly is moved from a dispense position to a fill position. The dispense pump sub-assembly is directed from the fill position to a purge position for purging a substantial portion of any gas bubbles collected at the dispense pump sub-assembly through a purge outlet disposed above the fluid inlet and above a fluid outlet of the dispense pump sub-assembly. The dispense pump sub-assembly is directed from the purge position to a dispense position, whereby a desired volume of the fluid is dispensed from the dispense pump sub-assembly.

This invention has many advantages. A fluid, such as a photoresist fluid, is filtered in the filtration sub-assembly and then, in a separate step, the dispense pump sub-assembly dispenses a desired volume of resulting filtered fluid from the integrated system. Filtration and dispense steps are performed separately. Therefore, filtration of fluid can be extended for a period of time which is longer than the period of time required to dispense the filtered fluid. The likelihood of forcing gas bubbles through the filter is thereby significantly reduced. Also, the dispensing means allows a portion of any gas bubbles which have accumulated in the dispense pump sub-assembly to be purged before the fluid is dispensed. The gas bubbles are purged through a purge outlet which is disposed above both the fluid inlet and the fluid outlet of the dispense chamber. The dispense chamber is then isolated, such as by closing valves at the fluid inlet and at the purge outlet, to seal the dispense chamber from purged bubbles and from bubbles trapped in the filtration sub-assembly. The amount of gas bubbles purged from the dispense chamber before fluid is dispensed is thereby significantly increased and the probability that gas bubbles will be dispensed with the fluid onto a substrate is significantly reduced. Further, because the filtration and dispense steps are carried out separately, the variation of pressure in the fluid during flow through the integrated system is significantly diminished, thereby significantly reducing the probability that any gas bubbles will form in the fluid. The consequent reduction in the number of gas bubbles dispensed with the filtered fluid significantly reduces the formation of coating defects during repetitive cycles of filtration and dispensing of the fluid onto a substrate.

In a preferred embodiment, the dispensing means is operated by extending and contracting a bellows to displace a displacement fluid in which the bellows is immersed. The displacement fluid thereby moves a diaphragm which, in turn, causes fluid to be dispensed from the integrated system. Employment of a bellows significantly diminishes leakage of displacement fluid, such as leakage of displacement fluid across a seal at a piston employed to direct a displacement fluid against a diaphragm. Also, there is no friction between the bellows and a lead screw used to extend and contract the bellows. Further, a biasing spring can be disposed at the bellows to maintain the lead screw under tension or compression. Maintaining the lead screw under tension or compression significantly reduces variability of displacement caused by wear between the lead screw and a threaded drive unit engaging the lead screw.

Valves in the integrated system include a valve cup and a biasing means which bias the valves toward a closed position on a valve seat. Precision of the volume of fluid displaced by valve action is thereby significantly increased. An additional benefit is that all valves of the integrated system close when power employed to operate the valves is lost, thereby preventing significant leakage of fluid from the integrated system.

The amount of fluid used to form protective masks can also be significantly reduced by the present invention. For example, fluid waste, which is typically caused by ensuring that enough fluid has been dispensed to form a suitable photoresist mask, is reduced by diminished variation of the amount of photoresist fluid dispensed during each dispense cycle. Also, a conduit can extend from the purge outlet to the fluid inlet of the filtration sub-assembly for directing fluid accompanying purged gas bubbles back through the filter, whereby any gas bubbles can be separated from the fluid by periodic venting of the filter. The amount of fluid lost by purging gas bubbles from the filtered fluid is thereby significantly reduced by recycling fluid purged with the gas bubbles.

DETAILED DESCRIPTION OF THE INVENTION

The features and other details of the apparatus and method of the invention will now be more particularly described with reference to the accompanying drawings and pointed out in the claims. The same number present in different figures represents the same item. It will be understood that the particular embodiments of the invention are shown by way of illustration and not as limitations of the invention. The principle features of this invention can be employed in various embodiments without departing from the scope of the invention.

Figure 1:
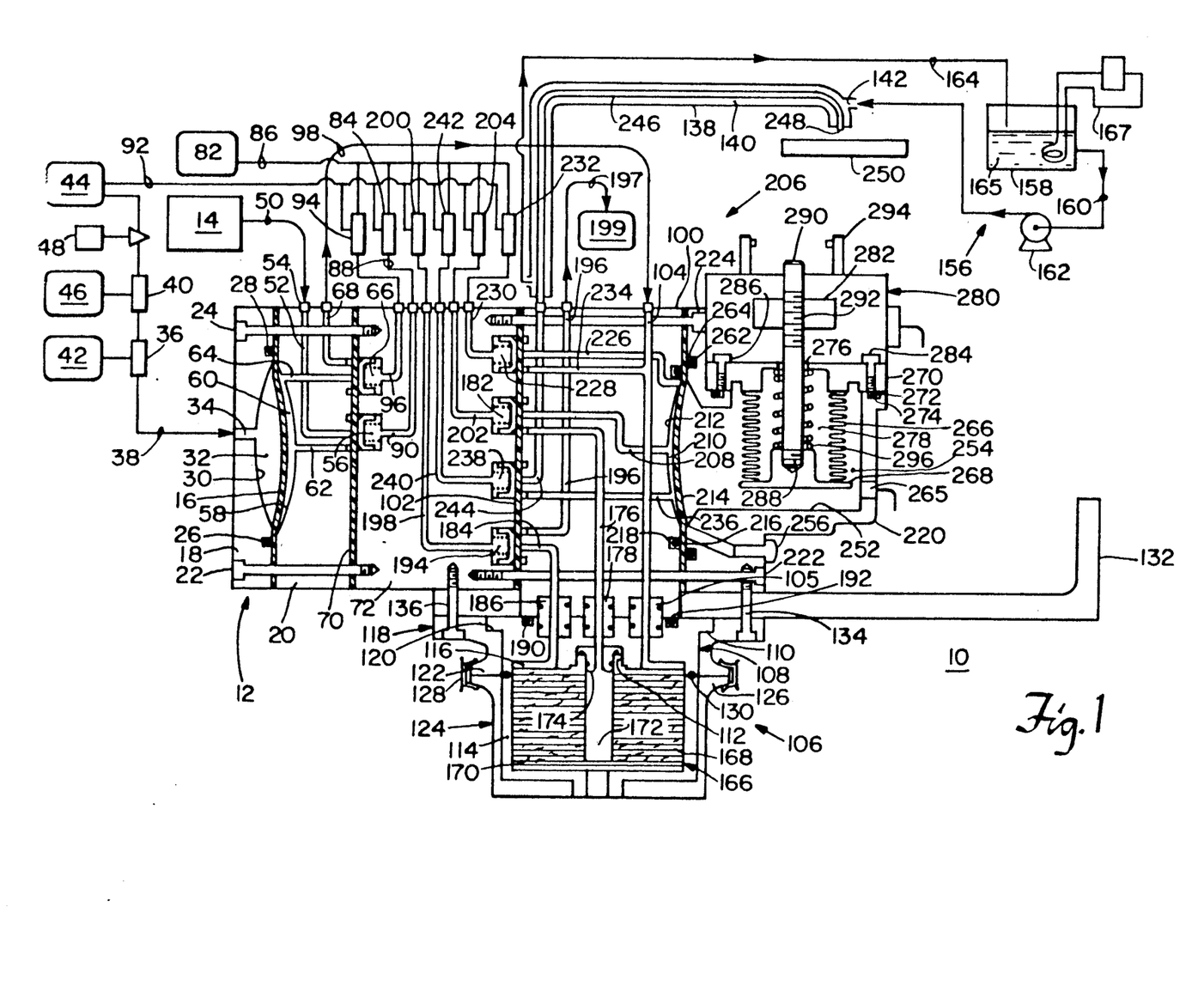
FIG. 1 is a schematic representation of the integrated system wherein all of the valves of the invention are closed.

Integrated system 10 includes feed pump sub-assembly 12 for receiving a fluid from fluid source 14. An example of a typical fluid for use with integrated system 10 is Shipley Megaposit SPR2 1.3 type positive photoresist fluid, commercially available from Shipley, Inc.

Feed pump sub-assembly 12 includes feed diaphragm 16. Preferably, feed diaphragm 16 is formed of Teflon polytetrafluoroethylene having a thickness in the range of between about 0.2 and about 0.4 millimeters. Feed diaphragm 16 is supported between end cap 18 and feed plate 20 by bolts 22,24. Gasket 26 is disposed within annular recess 28 of end cap 18 and abuts feed diaphragm 16. End cap 18 includes recessed portion 30, which is configured as a spherical section. Feed diaphragm 16 and recessed portion 30 of end cap 18 define feed displacement chamber 32. Chamber inlet 34 is defined by end cap 18.

Chamber inlet 34 is coupled to solenoid 36 by conduit 38. Solenoid 36 is moveable between a first position and a second position. In the first position, fluid communication is provided by solenoid 36 between solenoid 40 and feed displacement chamber 32 through conduit 38 and chamber inlet 34. In the second position, fluid communication is provided solenoid 36 between first pneumatic pressure source 42 and feed displacement chamber 32. The gas at first pneumatic pressure source 42 is a suitable gas for pressurization of feed displacement chamber 32. Examples of suitable gases include nitrogen, air, etc. The pressure of gas at first pneumatic pressure source 42 is sufficient to move feed diaphragm 16 from a feed position, shown in FIG. 1, to a load position, not shown. Preferably, the pressure at first pneumatic pressure source 42 is in the range of between about two and about eight psig. In a particularly preferred embodiment, the pressure of gas at first pneumatic pressure source 42 is about four psig.

Solenoid 40 is moveable between a first position and a second position. In the first position of solenoid 40, fluid communication is provided between vacuum source 44 and solenoid 36 through conduit 38. In the second position of solenoid 40, fluid communication is provided between atmospheric pressure source 46 and solenoid 36. Needle valve 48 at conduit 38 dampens the rate of pressure change within feed displacement chamber 32 during switching of solenoid 40 between the first and second positions. An example of a suitable needle valve is a MNV-2 model needle valve, commercially available from Clippard Minimatic Corp.

Fluid conduit 50 extends between fluid source 14 and fluid inlet 52 for conducting fluid from fluid source 14 to fluid inlet 52. Fluid inlet 52 is defined by feed plate 20 and is coupled to fluid conduit 50 by coupler 54. An example of a suitable coupler is a IMP 42 UAM PFA model coupler, commercially available from Furon Corporation. Fluid inlet 52 extends from fluid conduit 50 to inlet valve 56 of feed pump sub-assembly 12.

Feed plate 20 includes recessed portion 58, which is configured as a spherical section and is disposed opposite recessed portion 30 of end cap 18. Feed diaphragm 16 and recessed portion 58 define feed chamber 60. Feed chamber inlet 62 is defined by feed plate 20 and extends between inlet valve 56 and feed chamber 60. Feed chamber outlet 64 is defined by feed plate 20 and extends between feed chamber 60 and isolate valve 66 of feed pump sub-assembly 12.

Feed channel 68 is defined by feed plate 20. First valve diaphragm 70 is disposed between feed plate 20 and valve plate 72. Feed plate 20, first valve diaphragm 70 and valve plate 72 are fastened together by bolts 22,24. In one embodiment, first valve diaphragm 70 is formed of polytetrafluoroethylene. Preferably, the thickness of first valve diaphragm is in the range of between about 0.2 and about 0.4 millimeters.

Figure 2:
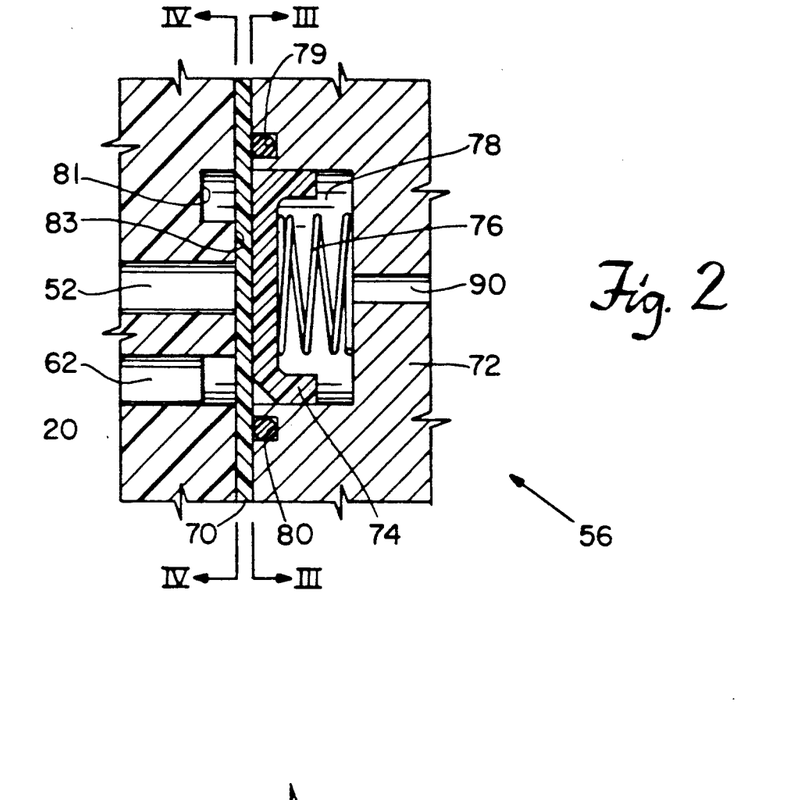
FIG. 2 is a section view of a valve of the integrated system wherein the valve is in the closed position.

Each valve in integrated system 10 includes a valve diaphragm, a valve cup and a biasing means, such as a coil spring. For example, as can be seen in FIG. 2, inlet valve 56 includes first valve diaphragm 70, valve cup 74 and coil spring 76. Valve cup 74 and coil spring 76 are disposed within recessed portion 78 of valve plate 72. Valve cup 74 is biased against first valve diaphragm 70 by coil spring 76. Gasket 79 is disposed in annular recessed portion 80 of valve plate 72 at inlet valve 56 and seals recessed portion 78 from the atmosphere. Also, gasket 79 seals fluid in annular recessed portion 81 from leaking between first valve diaphragm 70 and feed plate 20. Feed chamber inlet 62 extends from annular recessed portion 81 of feed plate 20.

When inlet valve 56 is in the closed position, first valve diaphragm 70 seals fluid inlet 52 from annular recessed portion 81 at valve seat 83, which is disposed between fluid inlet 52 and annular recessed portion 81. When recessed portion 78 is sufficiently pressurized with a gas, inlet valve 56 is closed, whereby valve diaphragm 70 and valve cup 74 are directed against valve seat 83 with a force sufficient to seal fluid inlet 52 from annular recessed portion 81 and from feed chamber inlet 62. A sufficient gas pressure in recessed portion 78 to maintain inlet valve 56 in the closed position is in the range of between about fifteen and about forty-five psig. In a particularly preferred embodiment, the pressure is about twenty psig. Examples of suitable gases include air, nitrogen, etc.

Returning to FIG. 1, gas pressure in recessed portion 78 is provided by second pneumatic pressure source 82. When inlet valve 56 is closed, fluid communication is provided between second pneumatic pressure source 82 and recessed portion 78 through a suitable pneumatic controller. An example of a suitable pneumatic controller is a solenoid. Preferably, the solenoid is a Series III model solenoid, manufactured by LDI Pneutronics Corp.

In a pressurized position, solenoid 84 provides fluid communication between conduit 86, which extends from second pneumatic pressure source 82, and conduit 88, which extends from solenoid 84 to inlet valve channel 90. Inlet valve channel 90 is defined by valve plate 72. In a vacuum position, solenoid 84 provides fluid communication between conduit 92, which extends from vacuum source 44, and inlet valve channel 90. Solenoid 84 is actuated to alternate between the pressurized and vacuum positions. Actuation of solenoid 84 from the pressurized position to the vacuum position causes inlet valve 56 to move from the closed position, shown in FIG. 1, to an open position, not shown. In the open position, inlet valve 56 provides fluid communication between fluid inlet 52 and feed chamber inlet 62.

Isolate valve 66 is disposed between feed chamber outlet 64 and feed channel 68. In the closed position, isolate valve 66 seals feed chamber outlet 64 from feed channel 68, also defined by feed plate 20. Isolate valve 66 is moveable between a closed position, shown in FIG. 1, to an open position, not shown, by actuation of solenoid 94. Actuation of solenoid 94 alternately provides fluid communication between second pneumatic pressure source 82 or vacuum source 44, and isolate valve channel 96, which is defined by valve plate 72.

Feed conduit 98 is coupled to feed plate 20 at feed channel 68 and extends from feed plate 20 to dispense plate 100. Dispense plate 100 is disposed adjacent valve plate 72. Second valve diaphragm 102 is disposed between valve plate 72 and dispense plate 100. Feed conduit 98 is coupled to dispense plate 100 at filter chamber inlet channel 104. Filter chamber inlet channel 104 is defined by dispense plate 100, filtration sub-assembly 106, and by fitting 105. Filtration sub-assembly 106 is disposed adjacent to dispense plate 100. Fitting 105 provides a seal at filter chamber inlet channel 104 where dispense plate 100 and filtration sub-assembly 106 meet.

Filtration sub-assembly 106 includes pump cap 108 which partially defines filter chamber inlet channel 104. Pump cap 108 includes lip 110 and recessed portion 112 for receiving a filter cartridge. Pump cap 108 and sleeve 114 of filtration sub-assembly 106 define filter chamber 116. Transition plate 118 of filtration sub-assembly 106 includes recessed portion 120 which supports pump cap 108 at lip 110. Transition plate 118 also includes flange 122. Flange 122 abuts housing 124 of filtration sub-assembly 106 at flange 126. Transition plate 118 and housing 124 are joined by clamp 128, which is disposed about flange 122 of transition plate 118 and flange 126 of housing 124 to thereby form a seal at gasket 130, which is disposed between pump cap 108 and sleeve 114. Filtration sub-assembly 106 can include a jacket, not shown, disposed about housing 124 for conducting a medium about housing 124 to thereby control the temperature of fluid within filter chamber 116. Filtration sub-assembly 106 is joined to bracket 132 by bolts 134,136. Bracket 132 is suitable for suspending integrated system 10 at a suitable support, such as a wall, not shown.

Filter cartridge 166 is disposed within filter chamber 116. Filter cartridge 166 includes plates 168, which support a suitable filter media 170. Filter conduit 172 is defined by cartridge filter 166. An example of a suitable cartridge filter is a WGFG 16H P2 model filter cartridge, commercially available from Millipore Corporation. Cartridge adapter 174 is fitted to filter cartridge 166 at filter conduit 172 and is also fitted to pump cap 108 at recessed portion 112. Filter cartridge 166 is thereby fitted to pump cap 108 at recessed portion 112. Filtered-fluid channel 176 is defined by pump cap 108, dispense plate 100 and fitting 178. Filtered-fluid channel 176 is disposed at recessed portion 112 and provides fluid communication between filter conduit 172 and barrier valve 182. Filtered-fluid channel 176 at pump cap 108 is sealed from filter chamber 116 by cartridge adapter 174.

Alternatively, filter cartridge 166 and sleeve 114 can be an integral unit which is disposable and replaced when a new cartridge filter is required. For example, filter cartridge 166 and sleeve 114 can be suitably fastened together to form an integral unit.

Filter chamber vent 184 extends between filter chamber 116 and vent valve 194, and is defined by pump cap 108, dispense plate 100 and by fitting 186. Gasket 190 is disposed within annular recess 192 of pump cap 108 and extends about fittings 105, 178 and 186.

Vent channel 196 is defined by dispense plate 100 and extends from vent valve 194 to conduit 197. Conduit 197 provides fluid communication between vent channel 196 and waste container 199. Alternatively, a return line, not shown, can extend between vent channel 196 and fluid source 14 for returning fluid vented with any gas bubbles to fluid source 14. Vent valve 194 is moveable between a closed position, shown in FIG. 1, wherein filter chamber 116 is sealed from waste container 199, and an open position, not shown, wherein filter chamber 116 is in fluid communication with waste container 199. Vent valve channel 198 is defined by valve plate 72 and extends from vent valve 194 to solenoid 200. Solenoid 200 is actuated between a pressure position and a vacuum position, whereby fluid communication is alternately provided between second pneumatic pressure source 82 or vacuum source 44, and vent valve channel 198.

Barrier valve 182 is disposed at an end of filtered-fluid channel 176 which is opposite to that of filter cartridge 166. Barrier valve channel 202 is defined by valve plate 72 and extends from barrier valve 182 to solenoid 204. Solenoid 204 is in fluid communication with second pneumatic pressure source 82 and vacuum source 44. Barrier valve 182 is moveable between a closed position and an open position by actuation of solenoid 204 between a pressurized position and a vacuum position, respectively.

Dispense pump sub-assembly 206 is a dispensing means. Dispense pump sub-assembly 206 includes dispense chamber inlet channel 208 as a fluid inlet to dispense chamber 210. Dispense chamber inlet channel 208 is defined by dispense plate 100 and extends from barrier valve 182 to dispense chamber 210. Dispense chamber 210 is defined by recessed portion 212 of dispense plate 100 and by dispense diaphragm 214. Recessed portion 212 is configured as a spherical section. Dispense chamber 210 is sealed by gasket 216, which is disposed within annular recess 218 of dispense plate 100.

Dispense diaphragm 214 is supported substantially vertically between dispense plate 100 and pump drive casting 220. Bolts 222, 224 extend through pump drive casting 220, dispense plate 100 and into valve plate 72 for securing pump drive casting 220 to dispense plate 100 and for securing dispense plate 100 to valve plate 72.

Purge channel 226 is a purge outlet for gas bubbles and associated fluid, and is disposed above dispense chamber inlet channel 208. Purge channel 226 is defined by dispense plate 100 and extends between the uppermost portion of dispense chamber 210 and purge valve 228. Purge valve channel 230 extends from purge valve 228 to solenoid 232 and is defined by valve plate 72. Purge valve 228 is moveable between a closed position, shown in FIG. 1, and an open position by actuation of solenoid 232. Solenoid 232 alternately provides fluid communication between second pneumatic pressure source 82 or vacuum source 44, and purge valve 228 to thereby operate purge valve 228.

When purge valve 228 is in the closed position, purge channel 226 is sealed from connector channel 234, which is defined by dispense plate 100. Connector channel 234 extends between purge valve 228 and a point along the path of fluid flow leading to filtration subassembly 106. In one embodiment, connector channel 234 extends from purge valve 228 to filter chamber inlet channel 104, as shown in FIG. 1. When purge valve 228 is in the open position, fluid communication is provided between dispense chamber 210 and filter chamber inlet channel 104 through purge channel 226 and connector channel 234.

Dispense chamber outlet channel 236 is a fluid outlet and is defined by dispense plate 100. Dispense chamber outlet channel 236 extends from a lower portion of dispense chamber 210 to outlet valve 238. Outlet valve 238 is moveable between a closed position, shown in FIG. 1, and an open position, not shown. Outlet valve channel 240 extends from outlet valve 238 to solenoid 242 and is defined by valve plate 72. Outlet valve 238 is moveable between the closed position and the open position by actuation of solenoid 242.

When outlet valve 238 is in the open position, fluid communication is provided between dispense chamber outlet channel 236 and dispense channel 244, which is defined by dispense plate 100. Dispense channel 244 is coupled with fluid outlet conduit 246. Fluid outlet conduit 246 includes end portion 248, which is disposed at substrate 250. Preferably, fluid outlet conduit 246 is a substantially rigid tube, formed of perfluoroalkoxytetrafluoroethylene (hereinafter "PFA") and having an internal diameter in the range of between about three and one-half and about four millimeters.

Jacket 138 is disposed about fluid outlet conduit 246. Jacket 138 and fluid conduit outlet 246 define jacket chamber 140. Jacket 138 defines jacket chamber inlet 142 and jacket chamber outlet 144. Jacket chamber 140 is suitable for conducting a medium about fluid outlet conduit 246 to thereby control the temperature of fluid within fluid outlet conduit 246.

Jacket 138 is coupled to recirculating temperature control system 156. Recirculating temperature control system 156 includes medium reservoir 158 and delivery conduit 16 extending from medium reservoir 158 to jacket chamber inlet 142. Pump 162 is disposed at delivery conduit 160 for directing a suitable medium from medium reservoir 158 to jacket chamber 140. Return conduit 164 extends from jacket chamber outlet 144 to medium reservoir 158. A suitable medium 165, such as water, is disposed within medium reservoir 158. The temperature of the medium is controlled at medium reservoir 158 by a suitable means, such as a suitable temperature control unit 167, disposed at medium reservoir 158. Actuation of pump 162 directs medium from medium reservoir 158 through delivery conduit 160, jacket chamber 140 and return conduit 164 to medium reservoir 158. The temperature of fluid within fluid outlet conduit 246 is controlled by controlling the temperature of medium directed through jacket chamber 140.

Pump drive casting 220 and dispense diaphragm 214 define dispense displacement chamber 252. Displacement fluid 254 is disposed within dispense displacement chamber 252. Plug 256 seals displacement fluid 254 within dispense displacement chamber 252. Plug 256 is generally only used during assembly of integrated system 10 to remove any residual gas following filling dispense displacement chamber 252 with displacement fluid 254. Gasket 262 is disposed within annular recess 264 of pump drive casting 220 to seal displacement fluid 254 within dispense displacement chamber 252. Pressure sensor 265 is disposed at dispense displacement chamber 252. A suitable jacket, not shown, can be disposed about pump drive casting 220 for recirculating a fluid about pump drive casting. The temperature of displacement fluid 254 within dispense displacement chamber 252 can thereby be controlled.

A displacement means includes bellows 266, which is submerged in displacement fluid 254. Bellows plug 268 is fixed to one end of bellows 266. Bellows 266 is fixed to motor mount 270 at an opposite end of bellows 266. In a particularly preferred embodiment, bellows 266 is a part number 27859-R bellows, commercially available from Robertshaw Controls, Inc. Motor mount 270 is disposed on pump drive casting 220. Gasket 272 is disposed within recessed portion 274 of pump drive casting 220 to provide a seal between pump drive casting 220 and motor mount 270. Motor mount 270 defines opening 276 which is disposed centrally to motor mount 270. Bellows 266, bellows plug 268 and motor mount 270 define bellows chamber 278. Bellows chamber 278 is sealed from dispense fluid within dispense displacement chamber 252.

Stepper motor 280 is disposed on motor mount 270 and includes threaded drive unit 282. Stepper motor 280 is fixed to motor mount 270 by bolts 284,286. Preferably, stepper motor 280 is a LA23GCK-213 model stepper motor, commercially available from Eastern Air Devices, Inc.

Lead screw 288 is fixed to bellows plug 268 and extends through opening 276 and stepper motor 280. Upper end 290 of lead screw 288 is disposed above stepper motor 280. Threads 292 at lead screw 288 are in threaded engagement with threaded drive unit 282. Lead screw 288 is moveable along a vertical axis by actuation of stepper motor 280. Preferably, lead screw 288 is maintained under tension or compression between bellows plug 268 and threaded drive unit 282 by bellows 266. Lead screw 228 thereby engages only one side of threads at threaded drive unit 282. Engagement of only one side of threads at threaded drive unit 282 substantially diminishes any inaccuracy of displacement by threaded drive unit 282 and lead screw 288 which is caused by wear at the threads and consequent shift between threaded drive unit 282 and lead screw 288 at the threads. Coil spring 296 is disposed within dispense displacement chamber 252 between bellows plug 268 and motor mount 270 to maintain lead screw 288 under tension or compression. Alternatively, lead screw 288 can be moved by threaded drive unit 282 to extend and compress bellows 266 without the presence of coil spring 296.

Movement of lead screw 288 along the vertical axis causes compression or extension of bellows 266 and consequent expansion or contraction of bellows chamber 278. Expansion and contraction of bellows chamber 278 causes displacement of displacement fluid 254 within displacement chamber 252. Displacement fluid 254 thereby moves dispense diaphragm 214 between a dispense position, shown in FIG. 1, a fill position and a purge position, not shown.

It is to be understood that other suitable means can be employed to displace displacement fluid 254 alternatively to bellows 266. For example, a piston, not shown, can be disposed in displacement chamber 252.

Sensor 294 is disposed on top of stepper motor 280 and is suitable for detecting the highest position of lead screw 288. An example of a suitable sensor is a photoelectric type sensor assembly. Preferably, sensor 294 is an EE-SX450-P1 type photoelectric sensor, commercially available from Omron, Inc.

In a preferred embodiment, end cap 18, valve plate 72, pump drive casting 220 and transition plate 118 are formed of an aluminum alloy. An example of a suitable aluminum alloy is 6061-T6 aluminum alloy. Also, in a preferred embodiment, feed plate 20, dispense plate 100, pump cap 108, sleeve 114 and cartridge adapter 174 are formed of polytetrafluoroethylene (hereinafter "PTFE"). Bellows plug 268 and motor mount 270 are preferably formed of brass. Clamp 128 is formed of a suitable material, such as stainless steel. End cap 18, feed plate 20, valve plate 72 and dispense plate 100 can be formed, for example, by machining. Pump drive casting 220 is typically formed by casting.

Channels defined by feed plate 20, valve plate 72, dispense plate 100 and filtration sub-assembly 106 have an internal diameter in the range of between about two and about five millimeters. In one embodiment, channels within end cap 18, feed plate 20, valve plate 72, dispense plate 100 and pump drive casting 220 are formed by drilling.

All gaskets are formed of suitable materials, such as are known in the art. Examples of suitable materials include Kalrez perfluoroelastomer, Viton fluoroelastomer, ethylene propylene rubber (hereinafter "EPR"), etc. Valve cups of valves in integrated system 10 are formed of a suitable material, such as aluminum alloy, stainless steel, brass, etc. Preferably, the valve cups are formed of aluminum alloy. Coil springs in the valves are also formed of a suitable material, such as 304 stainless steel, etc. All conduits extending from or to the channels are formed of suitable fluoropolymer materials, such as fluorinated ethylene propylene (hereinafter "FEP"), PFA, etc. Preferably, the conduits have an inner diameter in the range of between about 0.125 and about 0.187 inches and are formed of PFA.

Integrated system 10 is filled by operating integrated system 10 as though fluid were being dispensed. Fluid is thereby directed from fluid source 14 into integrated system 10 and through integrated system 10 until it reaches end portion 248 of fluid outlet conduit 246 at substrate 250. Gas bubbles and associated fluid in integrated system 10 are discharged through vent channel 196 to waste container 199 and also through fluid outlet conduit 246. The amount of fluid directed into integrated system 10 is sufficient to fill integrated system 10 with fluid while feed diaphragm 16 is in the feed position and dispense diaphragm 214 is in the dispense position, as shown in FIG. 1.

Solenoid 36 is in the first position at the beginning of operation of integrated system 10 to dispense fluid onto substrate 250. Solenoid 40 is in the second position at the beginning of operation of integrated system 10.

Fluid communication is thereby provided between the atmosphere and feed displacement chamber 32.

Integrated system 10 is operated by first moving solenoid 40 from the second position to the first position, whereby fluid communication is provided between vacuum source 44 and feed displacement chamber 32. Diminishment of gas pressure within feed displacement chamber 32 upon movement of solenoid 40 to the first position is dampened by needle valve 48.

Simultaneously with movement of solenoid 40 from the second position to the first position, inlet valve 56 is opened. Movement of the valves, such as inlet valve 56, from a closed position to an opened position, is illustrated in FIGS. 2 through FIG. 5. For example, inlet valve 56 is shown in the closed position in FIG. 2. Valve cup 74 is biased against first valve diaphragm 70 by a suitable biasing means, such as coil spring 76, disposed between valve cup 74 and valve plate 72 within recessed portion 78 of valve plate 72 and second pneumatic source 82. Inlet valve 56 is maintained in the closed position by maintaining a sufficient level of gas pressure within recessed portion 78 to direct first valve diaphragm 70 against valve seat 83, whereby fluid inlet 52 is sealed from feed chamber inlet 62.

Pressure within recessed portion 78 is maintained at a level sufficient to hold isolate valve 66 in the closed position by maintaining solenoid 84, (FIG. 1) in the pressure position, whereby fluid communication is provided between second pneumatic pressure source 82 and recessed portion 78 through inlet valve channel 90.

Figure 3:
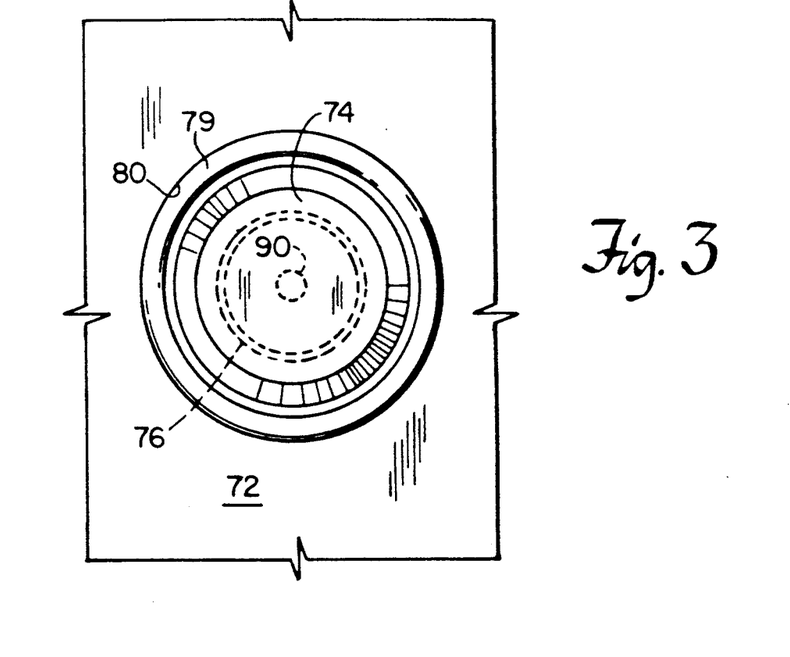
FIG. 3 is a view of the valve of FIG. 2 taken along line III—III.
Figure 4:
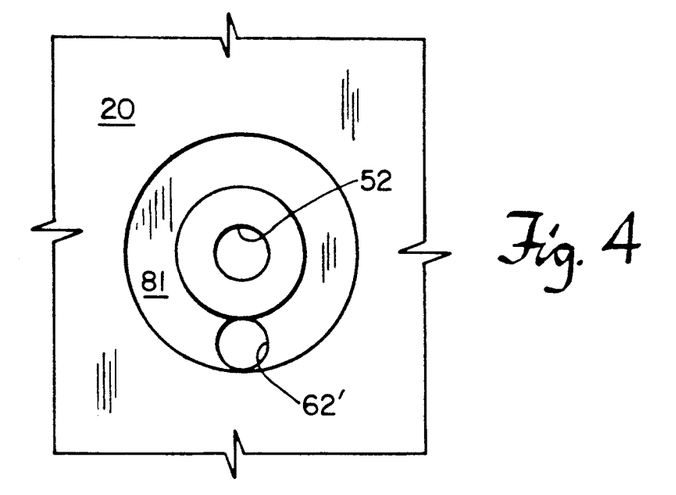
FIG. 4 is a section view of the valve of FIG. 2 taken along line IV—IV.

The portion of inlet valve 56 abutting first valve diaphragm 70 at valve plate 72 can be seen in FIG. 3. Recessed portion 78 and valve cup 74 are circular. Coil spring 76 is disposed behind valve cup 74 and is concentric with recessed portion 78. Likewise, inlet valve channel 90 is concentric to recessed portion 78. Alternatively, inlet valve channel 90 can be eccentric to recessed portion 78. Annular recess 80, within which gasket 79 is disposed, is disposed about recessed portion 78. The portion of inlet valve 56 facing first valve diaphragm 70 at feed plate 20 is shown in FIG. 4. Annular recessed portion 81 of feed plate 20 is concentric with fluid inlet 52. Feed chamber inlet 62 extends from annular recessed portion 81.

Figure 5:
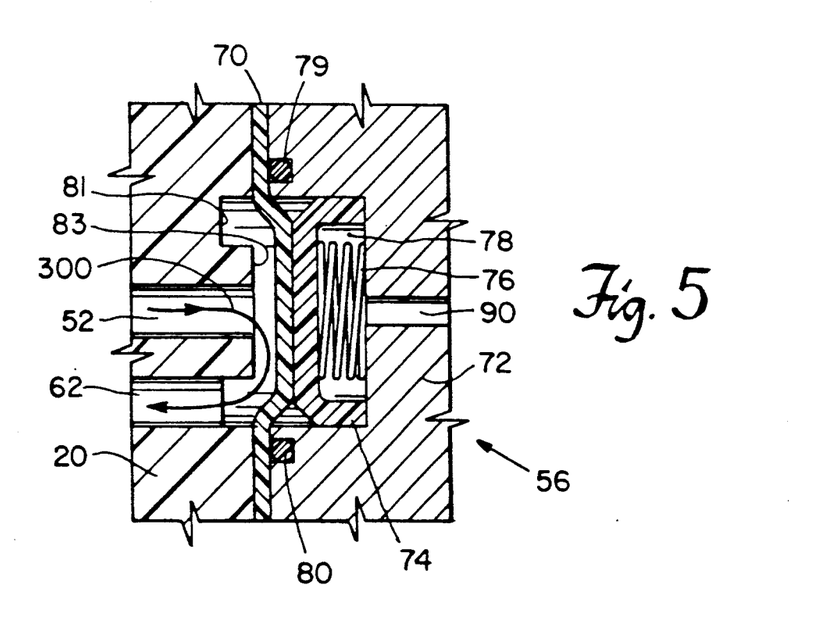
FIG. 5 is a section view of the valve shown in FIG. 2 wherein the valve is in an open position.

Inlet valve 56 is shown in the open position in FIG. 5. Inlet valve 56 is moved from the closed position to the opened position by actuating solenoid 84 (FIG. 1) from the pressure position to the vacuum position. Fluid communication is thereby provided between vacuum source 44 and recessed portion 78 through conduit 88 and inlet valve channel 90. Pressure within recessed portion 78 (FIG. 5) is thereby reduced in an amount sufficient to cause pressure of fluid within fluid inlet 52 to direct first valve diaphragm 70 away from valve seat 83.

Direction of first valve diaphragm 70 away from valve seat 83 causes valve cup 74 to compress coil spring 76. Valve cup 74 compresses coil spring 76 until valve cup abuts valve plate 72 within recessed portion 78. Direction of first valve diaphragm 70 away from valve seat 83 provides fluid communication between fluid inlet 52 and feed chamber inlet 62. Fluid within fluid inlet 52 can thereby be directed from fluid inlet 52 into annular recessed portion 81 and from annular recessed portion 81 into feed chamber inlet 62, in a direction indicated by arrow 300.

Opening of inlet valve 56 provides fluid communication between fluid inlet 52 and feed chamber inlet 62.

The simultaneous reduction of pressure within feed displacement chamber 32 (FIG. 1) by movement of solenoid 40 from the second position to the first position causes fluid to be directed from fluid source 14 though fluid conduit 50, fluid inlet 52, across inlet valve 56 and through feed chamber inlet 62 into feed chamber 60. Feed diaphragm 16 thereby moves from the feed position, to the load position, shown in FIG. 6.

Figure 7:
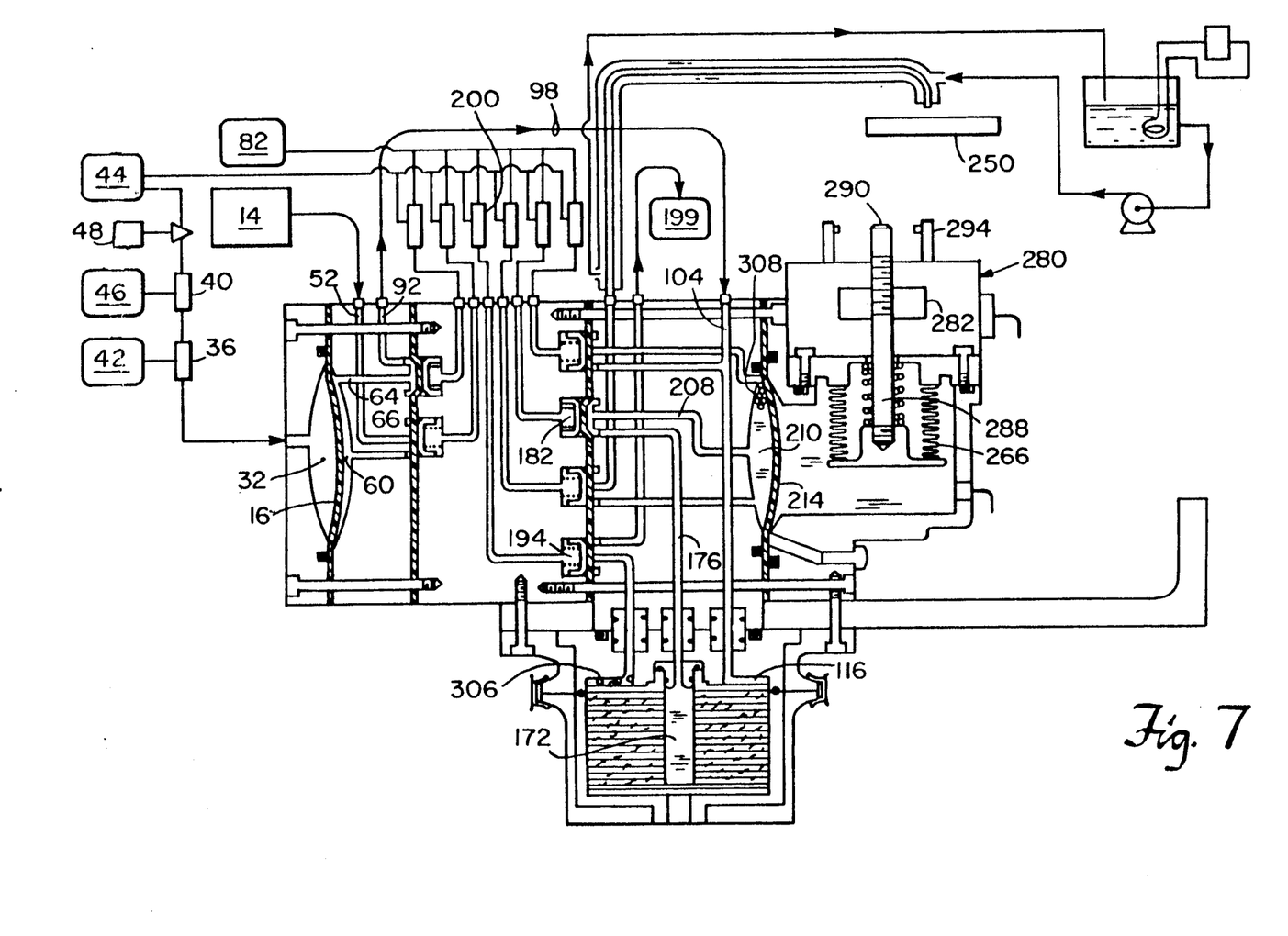
FIG. 7 is a schematic representation of the embodiment shown in FIG. 6 wherein fluid in the feed pump sub-assembly has been filtered in a filtration sub-assembly and directed into a dispense pump sub-assembly.

The volume of fluid entering feed chamber 60 to displace feed diaphragm 16 from the feed position to the load position is sufficient to subsequently displace dispense diaphragm 214 from the dispense position to the fill position. Preferably, the period of time during which feed diaphragm 16 is moved from the feed position to the load position is about 3.5 seconds. Inlet valve 56 is then closed by actuation of solenoid 84 from the vacuum position to the pressurized position. Feed chamber 60 is thereby sealed from fluid inlet 52, as shown in FIG. 7.

Simultaneously with closing of inlet valve 56, solenoid 36 is moved from the first position to the second position, whereby solenoid 40 is sealed from feed displacement chamber 32 and fluid communication is provided between first pneumatic pressure source 42 and feed displacement chamber 32. Also, isolate valve 66 and barrier valve 182 are moved from their respective closed positions to open positions by actuation of solenoids 94 and 204, respectively.

Movement of isolate valve 66 from the closed position to the open position provides fluid communication between feed chamber 60 and filter chamber 116 through feed chamber outlet 64, isolate valve 66, feed channel 68, feed conduit 98 and filter chamber inlet channel 104. Movement of barrier valve 182 from the closed position to the open position provides fluid communication between filter chamber 116 and dispense chamber 210 through filtered fluid channel 176 and dispense chamber inlet channel 208.

Stepper motor 280 is actuated to cause threaded drive 282 to rotate in a clockwise direction, as viewed from above stepper motor 280. Actuation of stepper motor 280 causes lead screw 288 to move from the dispense position, shown in FIG. 1, to the fill position, shown in FIG. 6. During movement of lead screw 288 from the dispense position to the fill position, end portion 290 of lead screw 288 moves into interfering relation with signal transmission at sensor 294. Bellows 266 is compressed by movement of lead screw 288 and the volume of bellows chamber 278 in dispense displacement chamber 252 is thereby diminished.

Figure 6:
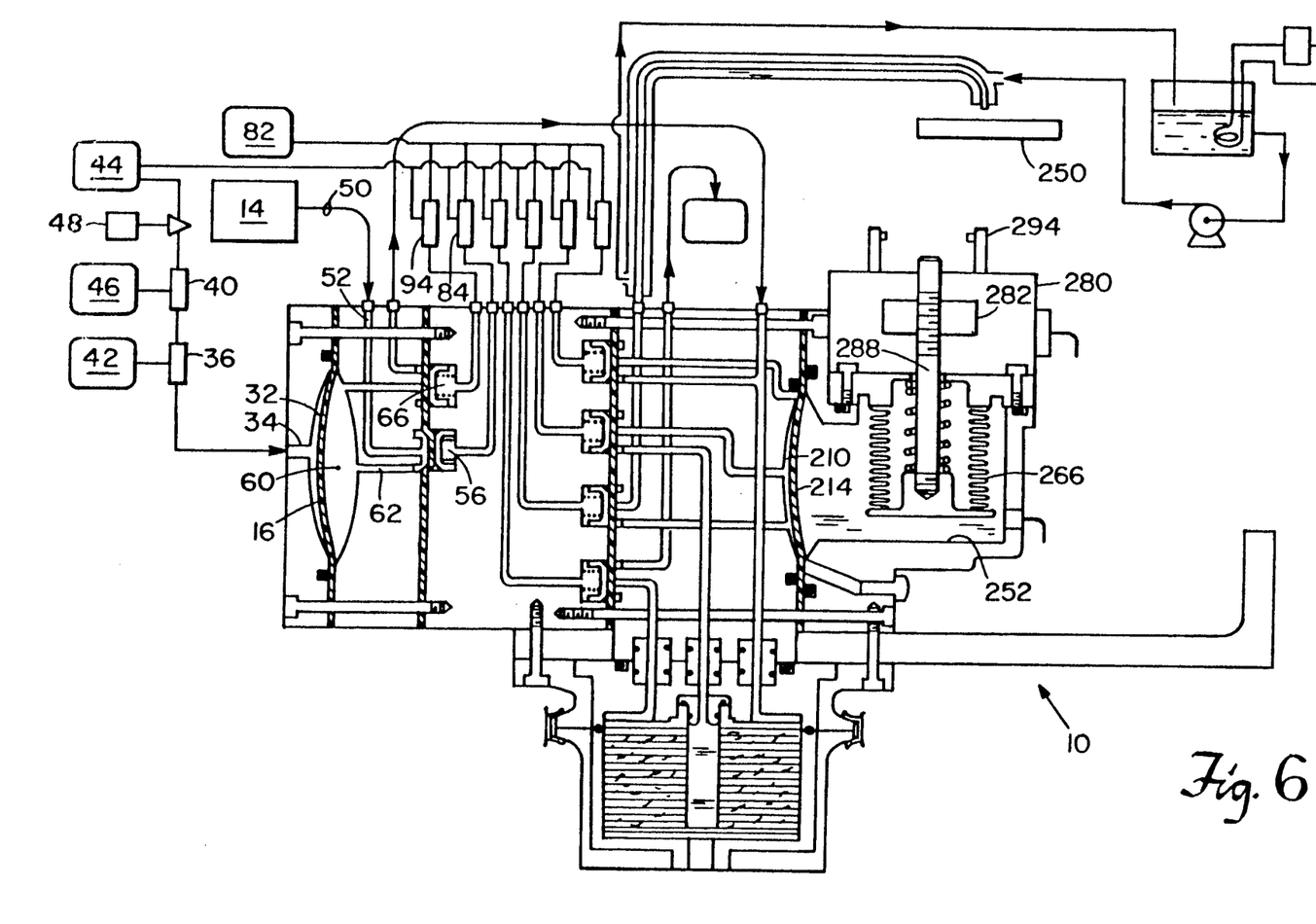
FIG. 6 is a schematic representation of the embodiment of the integrated system shown in FIG. 1 wherein fluid has been fed to a feed pump sub-assembly from a fluid source.

Actuation of solenoid 36 to the second position and actuation of stepper motor 280 causes feed diaphragm 16 to move from the load position to the feed position and causes dispense diaphragm 214 to move from the dispense position, shown in FIG. 6, to the fill position, shown in FIG. 7. The combined movement of feed diaphragm 16 from the load position to the feed position and of dispense diaphragm 214 from the dispense position to the fill position causes displacement of fluid within integrated system 10. A portion of fluid in feed chamber 60 is displaced from feed chamber 60 through feed chamber outlet 64 and across isolate valve 66. Fluid is directed through feed channel 68, feed conduit 98 and filter chamber inlet channel 104 to filter chamber 116. Fluid in filter chamber 116 is directed through filter cartridge 166 and is thereby filtered.

At least a portion of gas bubbles 306 which accumulate in filter chamber 116, such as gas bubbles which are entrained from fluid source 14 during displacement of fluid from feed chamber 60 and gas bubbles which form when filter cartridge 166 is submerged in fluid in filter chamber 116, collect at the top of filter chamber 116. Gas bubbles can also form in the fluid by, for example, diminishment of pressure on the fluid during operation of integrated system 10 or by warming of the fluid within integrated system 10.

Filtered fluid in filter conduit 172 is directed through filtered fluid channel 176, across open barrier valve 182 and through dispense chamber inlet channel 208 into dispense chamber 210. The amount of fluid directed into dispense chamber 210 is sufficient for a single dispense volume which is to be dispensed onto substrate 250. Preferably, the period of time during which feed diaphragm 16 is moved from the load position to the feed position, and dispense diaphragm 214 is moved from the dispense position to the filled position, is about fifteen seconds. At least a portion of any gas bubbles 308 which accumulate in dispense chamber 210, such as gas bubbles which pass through filter cartridge 166 and gas bubbles which form during displacement of fluid from filtration sub-assembly 106 to dispense chamber 210, collect at an uppermost portion of dispense chamber 210.

After lead screw 288 has reached the fill position, stepper motor 280 is stopped. Preferably, lead screw 288 reaches the fill position about 0.2 seconds before feed diaphragm 16 reaches the feed position. When stepper motor 280 is stopped, vent valve 194 is moved from the closed position, shown in FIG. 7, to an open position, shown in FIG. 8, by actuation of solenoid 200 from the pressurized position to the vacuum position. At least a portion of accumulated gas bubbles 306 in filter chamber 116 are displaced by pressure within filter chamber 116. The gas bubbles and fluid associated with the bubbles are displaced from filter chamber 116 through vent channel 196 and conduit 197 to waste container 199. The fluid collected in waste container 199 can be disposed of or returned to fluid source 14.

Figure 9:
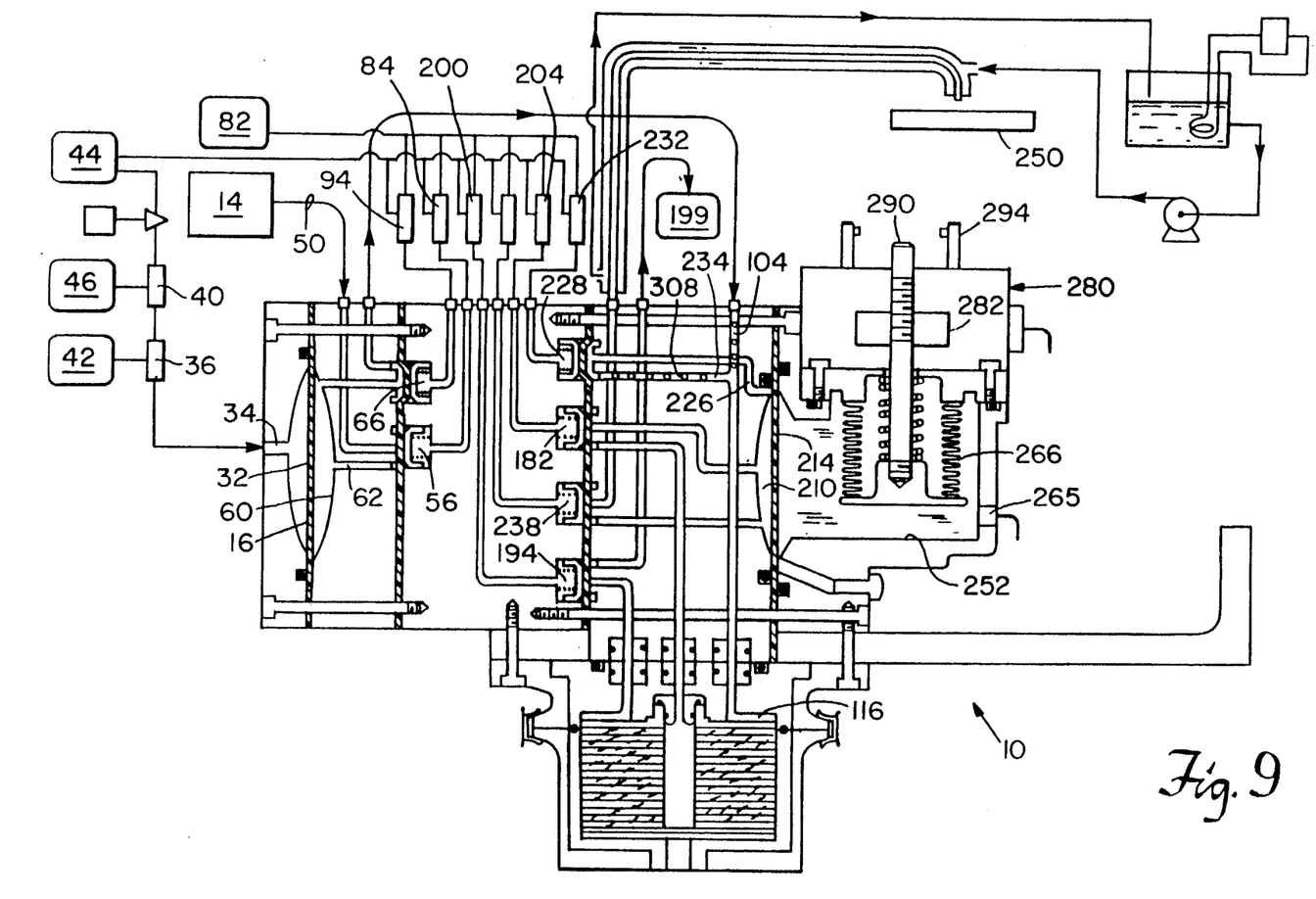
FIG. 9 is a schematic representation of the embodiment shown in FIG. 8 wherein accumulated gas bubbles have been purged from a dispense chamber of the dispense pump sub-assembly.

Vent valve 194 is then closed and barrier valve 182 is closed, as shown in FIG. 9. Simultaneously with closing of barrier valve 182, solenoid 36 is actuated from the second position to first position. Also, solenoid 40 is actuated from the first position, wherein fluid communication is provided between vacuum source 44 and solenoid 36, to the second position, wherein fluid communication is provided between atmospheric pressure source 46 and solenoid 36. Pressure within feed displacement chamber 32 is thereby diminished from a pressure of about four psig to about atmospheric pressure.

Figure 8:
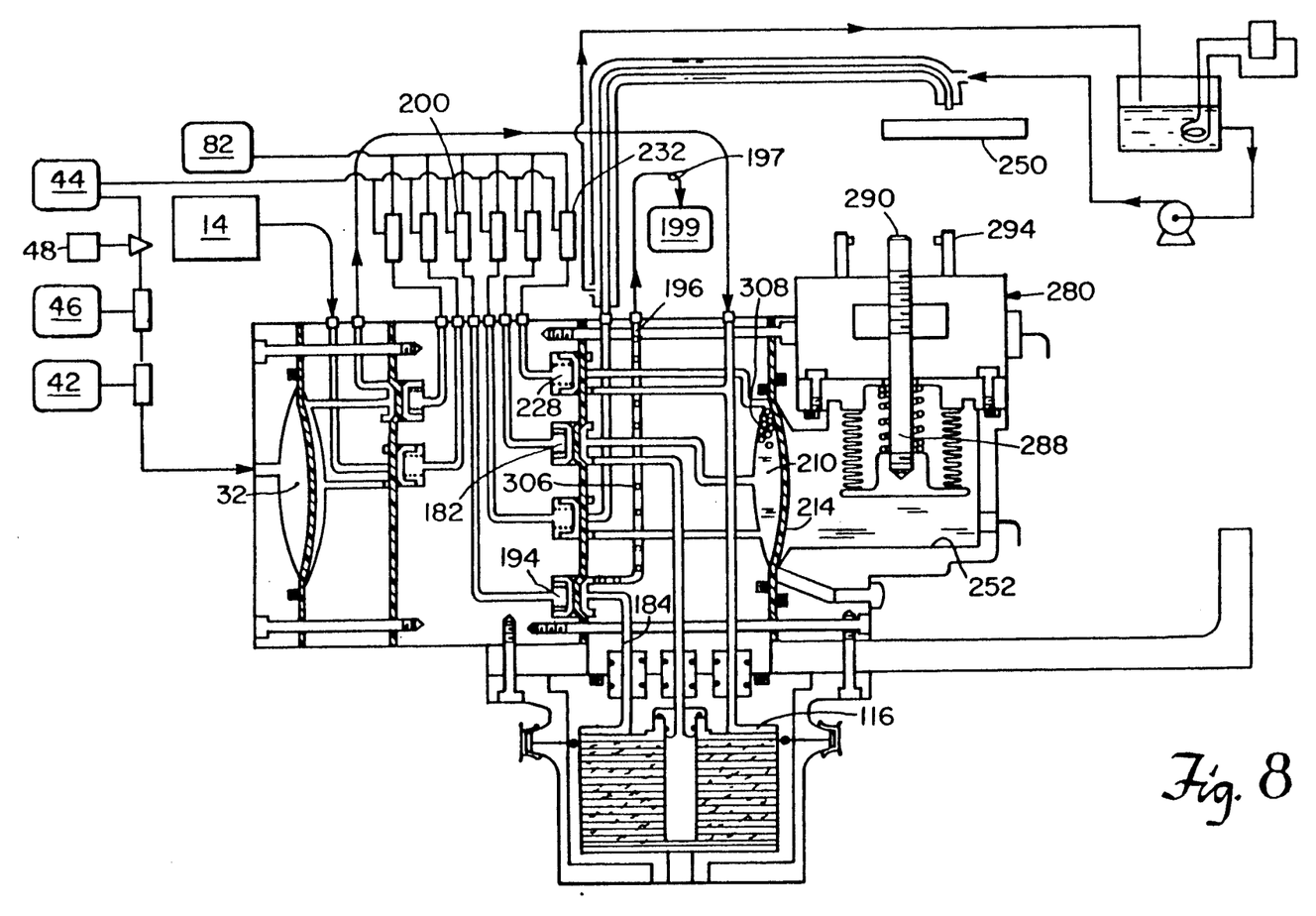
FIG. 8 is a schematic representation of the embodiment shown in FIG. 7 wherein accumulated gas bubbles have been vented from a filtration chamber of the filtration sub-assembly.

About 0.2 seconds after barrier valve 182 is closed, stepper motor 280 is actuated to thereby cause threaded drive 282 to rotate in a counter-clockwise direction, whereby lead screw 288 moves from the fill position, shown in FIG. 8, to a purge position, shown in FIG. 9. Bellows 266 is thereby extended and bellows chamber 278 is expanded to occupy a greater portion of dispense displacement chamber 252. Displacement fluid 254 within dispense displacement chamber 252 is displaced by extension of bellows 266. Dispense diaphragm 214 is thereby directed from the fill position, shown in FIG. 8, to a purge position, shown in FIG. 9.

Simultaneously with actuation of stepper motor 280 to cause threaded drive 282 to rotate in a counter-clockwise direction, purge valve 228 is moved from the closed position, shown in FIG. 8, to an open position, shown in FIG. 9, by actuation of solenoid 232 from the pressure position to the vacuum position. Gas bubbles 308 which have collected at the uppermost portion of dispense chamber 210, and fluid associated with gas bubbles 308, are purged by movement of dispense diaphragm 214 to the purge position. Gas bubbles 308 move from dispense chamber 210 through purge channel 226, purge valve 228 and connector channel 234 to filter chamber inlet channel 104. A substantial portion of any gas bubbles 308 and associated fluid within dispense chamber 210 are thus purged from dispense chamber 210. Preferably, the period of time during which gas bubbles 308 and associated fluid are purged from dispense chamber 210 is about two seconds.

Stepper motor 280 is then stopped and barrier valve 182 is opened simultaneously with stopping of stepper motor 280. Purge valve 228 is closed about one second after stepper motor 280 is stopped. Opening of barrier valve 182 provides fluid communication between dispense chamber 210, filter chamber 116 and feed chamber 60. Integrated system 10 can be maintained in this position for an extended period of time. Temperature-dependent volume change of fluid to be dispensed from dispense chamber 210 will cause movement of fluid into or out of dispense chamber 210 from filter chamber 116 and feed chamber by displacement of gas in feed displacement chamber 32, rather than cause the pressure of fluid in dispense chamber 210 to change. Gas in feed displacement chamber 32 is at atmospheric pressure because of fluid communication is provided between feed displacement chamber 32 and the atmosphere through solenoid 36 and solenoid 40. Therefore, fluid in dispense chamber 210 is maintained at about atmospheric pressure during this period of time.

An optional test to confirm the absence of gas bubbles in the dispense chamber can be performed at this time. Barrier valve 182 is closed, in order to seal all passages to dispense chamber 210. The pressure in displacement chamber 152 is measured using sensor 265. Stepper motor 280 is then actuated stepwise to rotate threaded drive unit 282 in a clockwise direction, while monitoring pressure change within sensor 265. The number of steps required to reach a given pressure is used to calculate the volume of gas in chambers 210 and 252. Motor 280 is then run back to the purge position and barrier valve 182 is reopened.

Figure 10:
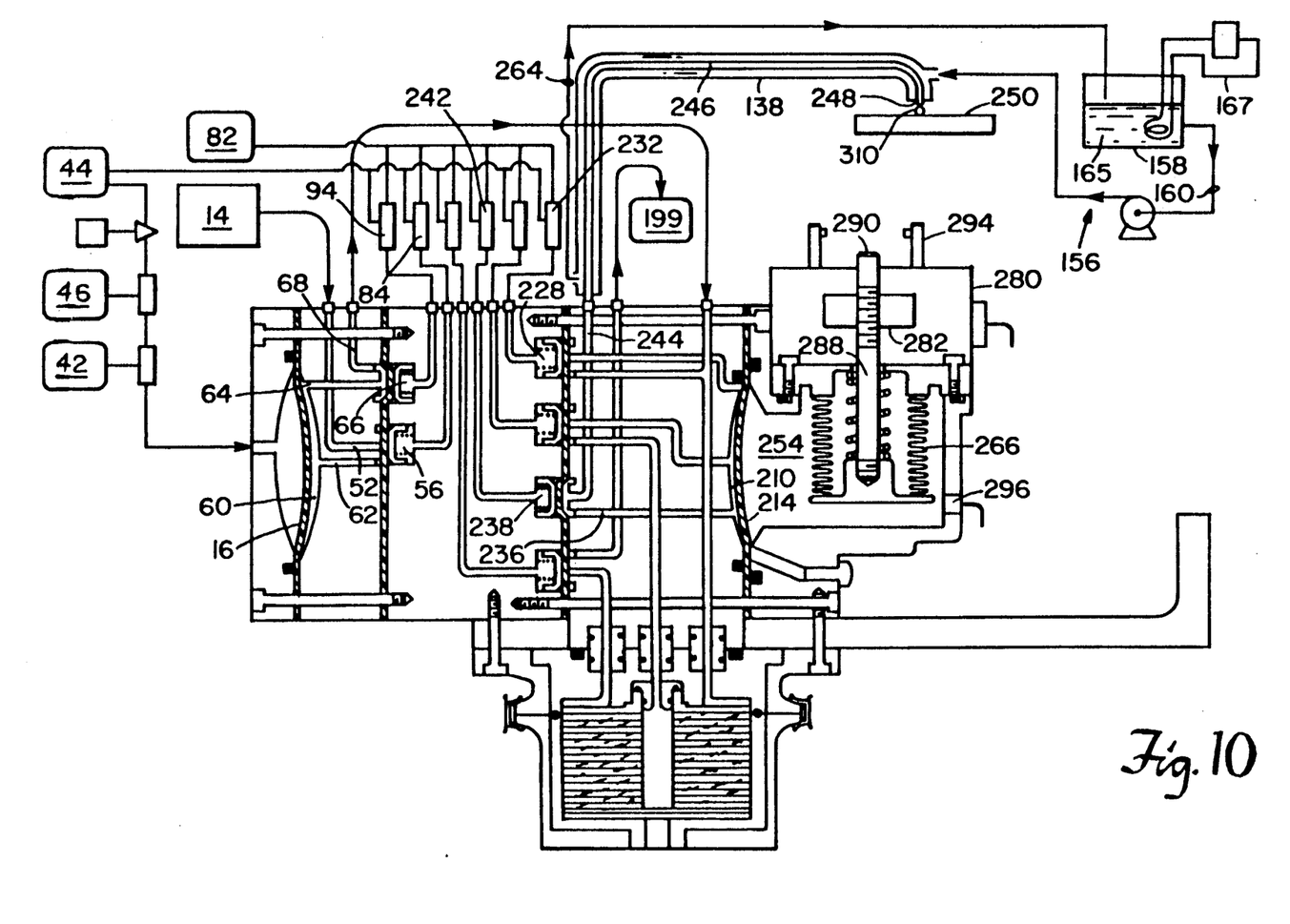
FIG. 10 is a schematic representation of the embodiment shown in FIG. 9 wherein fluid has been dispensed from the dispense chamber onto a surface of a substrate.

Thereafter, a dispensing step is begun by closing barrier valve 182 and moving outlet valve 238 from the closed position, shown in FIG. 9, to an open position, as shown in FIG. 10, by actuation of solenoid 242. Stepper motor 280 is then actuated to cause threaded drive 282 to rotate in a counter-clockwise direction and thereby direct lead screw 288 from the purge position, shown in FIG. 9, to the dispense position, shown in FIG. 10. Preferably, stepper motor 280 is actuated about 0.1 seconds after outlet valve 238 is opened.

Bellows 266 is extended by movement of lead screw 288, thereby increasing displacement of bellows chamber 278 within dispense displacement chamber 252. Displacement fluid 254 is thereby directed against dispense diaphragm 214, causing dispense diaphragm 214 to move from the purge position, shown in FIG. 9, to the dispense position, shown in FIG. 10. Fluid in dispense chamber 210 is displaced by movement of dispense diaphragm 214 from the purge position to the dispense position through dispense chamber outlet channel 236, outlet valve 238, dispense channel 244, fluid outlet conduit 246 and end portion 248 onto substrate 250. A single dispense unit 310 of fluid is thereby dispensed from fluid outlet conduit 246 onto substrate 250.

The volume of the dispense unit 310 is controlled by the volume of displacement fluid 254 displaced in dispense displacement chamber 252 and the consequent volume of fluid displaced from dispense chamber 210. Examples of suitable volumes of dispense unit 310 are in the range of between about 0.5 and about five milliliters. An example of a suitable dispense rate is in the range of between about one and about three milliliters per second. The temperature of fluid directed through fluid outlet conduit 246 can be controlled by activating pump 162 to pump medium 165 through jacket 138 of recirculating temperature control system 156. The temperature of medium 165 is controlled by temperature control unit 167.

When dispense diaphragm 214 has reached the dispense position, as determined by the number of steps through which stepper motor 280 has moved, stepper motor 280 is stopped, thereby stopping movement of dispense diaphragm 214 and consequent displacement of fluid from within dispense chamber 210. Preferably, the period of time during which fluid is dispensed onto substrate 250 is about one second.

Less than about 0.1 second after stepper motor 280 has been stopped, stepper motor 280 is actuated to cause threaded drive 282 to rotate in a clockwise direction for a period of time of about 0.1 seconds. Dispense diaphragm 214 is thereby retracted slightly to direct fluid within fluid outlet conduit 246, dispense channel 244 and dispense chamber outlet channel 236 back toward dispense chamber 210. Direction of fluid back toward dispense chamber 210 substantially prevents excess fluid from being dispensed onto substrate 250 when outlet valve 238 is closed.

Outlet valve 238 is then moved from the open position, shown in FIG. 10, to the closed position, shown in FIG. 1. Preferably, outlet valve 238 is closed about 0.1 seconds, or less, after rotation of threaded drive 282 in the clockwise direction is stopped.

Solenoid 40 is then actuated from the second position to the first position. The rate of consequent pressure reduction is dampened by needle valve 48. Also, isolate valve 66 is moved from the open position, shown in FIG. 10, to the closed position, shown in FIG. 1, by actuation of solenoid 94. Preferably, solenoid 40 is actuated to the first position and isolate valve 66 is closed about 0.5 seconds after outlet valve 238 is closed. The cycle of filtration and dispensing of fluid onto substrate 250 can then be repeated.

As filter cartridge 166 becomes blocked with filtered particulates, the pressure in displacement fluid 254 during filtration diminishes. When the pressure of displacement fluid 254 during filtration reaches a suitable threshold pressure, pressure sensor 265 triggers an alarm, not shown. The alarm signals that filter cartridge 166 should be replaced with a new filter cartridge. An example of a suitable threshold pressure of displacement fluid 254 for causing pressure sensor 265 to trigger such an alarm is a pressure in the range of less than about 0.5 psig.

Filter cartridge 166 is then replaced by removing clamp 128, whereby housing 124 can be separated from transition plate 118. Sleeve 114 is simultaneously separated from pump cap 108, thereby exposing filter cartridge 166. Filter cartridge 166 can then be separated from pump cap 108 and replaced with a new filter cartridge. Filter chamber 116 is then refilled by operating integrated system 10 as though fluid were being dispensed. Once conduit 246 is filled, integrated system 10 is preferably filled by purging any air in filtered fluid channel 176 and dispense chamber 210 back through purge valve 228 and out of vent channel 196. The air is purged from filter chamber 116 by directing dispense diaphragm 214 to the purge position while purge valve 228 and vent valve 194 are held in the open position.

Figure 11:
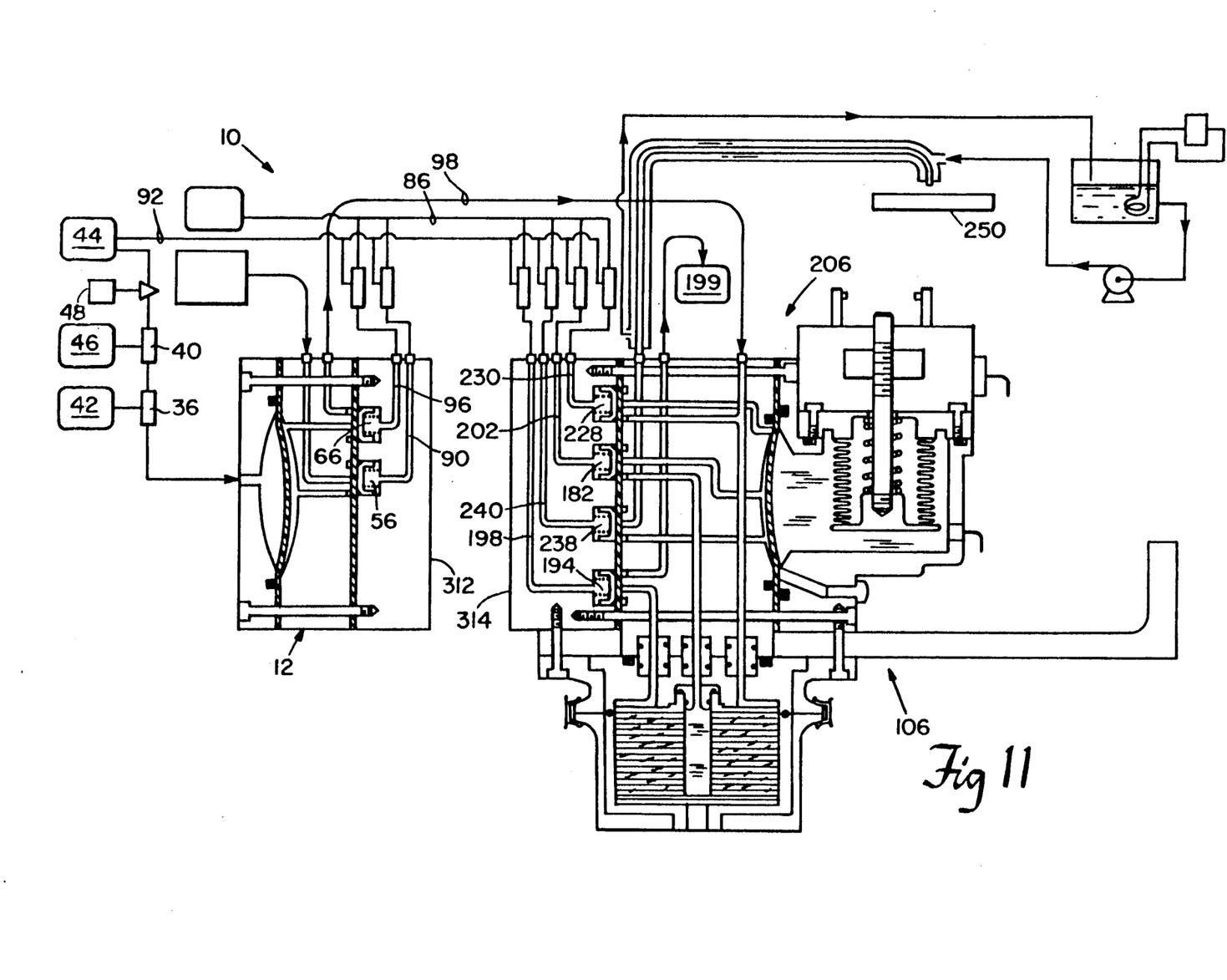
FIG. 11 is a schematic representation of an alternate embodiment of the invention wherein the feed pump sub-assembly is remote from the filtration sub-assembly and the dispense pump sub-assembly.

In an alternative embodiment, feed pump sub-assembly 12 is disposed remote from filtration sub-assembly 106 and from dispense pump sub-assembly 206, as shown in FIG. 11. Feed pump sub-assembly 12 is disposed remote from the remainder of integrated system 10 by replacing feed plate 20 with feed pump sub-assembly plate 312 and integrated system plate 314. Feed pump sub-assembly plate 312 includes inlet valve 56 and isolate valve 66, along with inlet valve channel 90 and isolate valve channel 96. Integrated system plate 314 includes barrier valve 182, barrier valve channel 202, vent valve 194, vent valve channel 198, purge valve 228, purge valve channel 230, outlet valve 238 and outlet valve channel 240.

Equivalents

Those skilled in the art will recognize, or be able to ascertain using no more than routine experimentation, many equivalents to the specific embodiments of the invention described specifically herein. Such equivalents are intended to be encompassed in the scope of the following claims.

We claim:

1. An integrated system for filtering a fluid and for dispensing a desired volume of the fluid, comprising:
   a) a filtration sub-assembly the filtration sub-assembly configured for housing a filter and having an inlet for receiving fluid from a feed pump and an outlet;
   b) a dispense pump sub-assembly integrally joined with the filtration sub-assembly and arranged for receiving filtered fluid from the outlet of the filtration sub-assembly, the dispense pump sub-assembly including,
      i) a fluid inlet,
      ii) a fluid outlet,
      iii) a purge outlet disposed above the fluid inlet and the fluid outlet, and
      iv) a dispensing means which is moveable from a fill position to a purge position for purging at least a portion of any gas bubbles and fluid associated with the gas bubbles in the filtered fluid chamber through the purge outlet, and moveable from the purge position to a dispense position for dispensing a desired volume of the fluid through the fluid outlet and out of the integrated system.

2. An integrated system of claim 1 wherein the dispensing means of the dispense pump sub-assembly includes a dispense diaphragm which is disposed substantially vertically and which partitions the dispense pump sub-assembly into a dispense chamber and a dispense displacement chamber.

3. An integrated system of claim 1 further including a pressure sensor disposed in the dispense displacement chamber for sensing a pressure of the displacement fluid which indicates that a filter disposed in the filtration sub-assembly should be replaced.

4. An integrated system of claim 1, further including a feed pump sub-assembly connected to the filtration sub-assembly, for directing fluid through the filter disposed in the filtration sub-assembly, said feed pump sub-assembly including an inlet for receiving the fluid from a fluid source, and an outlet joined with the inlet of the filtration sub-assembly for conducting fluid pumped by the feed pump sub-assembly to the filtration sub-assembly.

5. An integrated system of claim 4 wherein the feed pump sub-assembly includes a feed diaphragm which partitions the feed pump sub-assembly into a feed chamber and a feed displacement chamber, and wherein the feed diaphragm is moveable from a feed position to a load position, during which movement the fluid is received from the fluid source into the feed chamber, and from the load position to the feed position, during which movement fluid is directed through the filtration sub-assembly and to the dispense pump sub-assembly.

6. An integrated system of claim 5 wherein the feed pump sub-assembly is integrally joined with the filtration sub-assembly.

7. An integrated system of claim 1 wherein the dispensing means further includes:
   a) a displacement fluid disposed in the dispense displacement chamber,
   b) a bellows disposed in the displacement fluid, and
   c) a stepper motor connected to the bellows, whereby actuation of the stepper motor moves the bellows, the bellows thereby displacing the displacement fluid for causing movement of the dispensing means between the fill position, the purge position and the dispense position.

8. An integrated system of claim 7 further including a lead screw which connects the stepper motor to the bellows, wherein the lead screw is under tension during movement of the bellows between the fill position, the purge position and the dispense position.

9. An integrated system of claim 7 further including a connector channel disposed between the purge outlet to a point along the path of fluid flow leading to the filtration subassembly for allowing any gas bubbles and associated fluid to be directed from the dispense chamber to the filtration sub-assembly.

10. An integrated system of claim 9 wherein the connector channel extends from the purge outlet to the inlet of the filtration sub-assembly.

11. An integrated system of claim 10 wherein the filtration sub-assembly further includes gas venting means.

12. An integrated system of claim 4 further including valves disposed between the feed pump sub-assembly, the filtration sub-assembly and the dispense pump sub-assembly, between the dispense pump sub-assembly and the filtration subassembly and at the feed pump sub-assembly inlet and at the fluid outlet of the dispense pump sub-assembly.

13. An integrated system of claim 12 wherein each valve includes:
   a) a first body which defines,
      i) a first channel,
      ii) an annular recessed portion disposed about the first channel,
      iii) a second channel extending from the annular recessed portion; and
      iv) a valve seat disposed between the first channel and the annular recessed portion;
   b) a second body defining a recessed portion;
   c) a valve diaphragm disposed between the annular recessed portion of the first body and the recessed portion of the second body for sealing the first channel from the second channel at the valve seat; and
   d) a switching means at the recessed portion of the second body for directing the valve between a closed position, wherein the valve diaphragm seals the first channel from the annular recessed portion, and an open position, wherein fluid communication is provided between the first channel and the annular recessed portion.

14. An integrated system of claim 13 wherein each switching means includes,
   a) a valve cup abutting the valve diaphragm;
   b) a biasing means disposed at the valve cup for biasing the valve cup against the valve diaphragm; and
   c) a pneumatic controller in fluid communication with the recessed portion and the valve cup, and which is moveable between a pressure position, whereby sufficient pressure is applied to the valve diaphragm to maintain the valve in the closed position, and a vacuum position, whereby pressure at the valve diaphragm is sufficiently reduced to allow the valve to move to the open position.

15. An integrated system of claim 14 wherein each biasing means includes a coil spring which, when disposed in the recessed portion of the second body of the valve, is under sufficient compressive force to close the valve when the first channel, the second channel and the recessed portion are at atmospheric pressure.

16. An integrated system of claim 1 wherein the filtration sub-assembly includes an integral disposable filter cartridge and sleeve.

17. An integrated system for filtering a fluid and for dispensing a desired volume of the fluid, comprising:
   a) a system inlet for receiving the fluid from a fluid source;
   b) a feed pump sub-assembly for pumping fluid from the fluid source through a filter, said feed pump sub-assembly including an inlet for receiving the fluid from the system inlet, and an outlet for conducting fluid pumped by the feed pump sub-assembly to the filter;
   c) a filtration sub-assembly integrally joined with the feed pump sub-assembly for housing the filter, the filtration sub-assembly configured for housing a filter and having an inlet arranged for receiving fluid from the feed pump sub-assembly and an outlet;
   d) a dispense pump sub-assembly integrally joined with the filtration sub-assembly arranged for receiving filtered fluid from the filtration sub-assembly, the dispense pump sub-assembly including,
      i) a fluid inlet,
      ii) a fluid outlet,
      iii) a purge outlet disposed above the fluid inlet and the fluid outlet, and
      iv) a dispensing means which is moveable from a fill position to a purge position for purging at least a portion of any gas bubbles in the filtered fluid chamber through the purge outlet, and moveable from the purge position to a dispense position for dispensing a desired volume of the fluid through the fluid outlet and out of the integrated system; and
   e) a system outlet for conducting fluid, which has been dispensed form the dispense pump sub-assembly, out of the integrated system.

18. An integrated method for filtering a fluid and for dispensing a desired volume of the fluid, comprising:

a) directing a fluid from a fluid source through a filter disposed in a filtration sub-assembly and to a dispense pump sub-assembly which is integrally joined with the filtration sub-assembly, whereby the dispense pump sub-assembly is moved from a dispense position to a fill position;
b) directing the dispense pump sub-assembly from the fill position to a purge position for purging at least a portion of any gas bubbles collected at the dispense pump sub-assembly through a purge outlet disposed above the fluid inlet and above a fluid outlet of the dispense pump sub-assembly; and
c) directing the dispense pump sub-assembly from the purge position to a dispense position, whereby a desired volume of the fluid is dispensed from the dispense pump sub-assembly.

19. An integrated dispensing method of claim 18 further including the steps of:
a) directing a feed pump sub-assembly from a feed position to a load position for loading fluid from a fluid source into the feed pump sub-assembly; and
b) directing the feed pump sub-assembly from the load position to the feed position for feeding the fluid from the feed pump sub-assembly through the filter and the filtration sub-assembly to the dispense pump sub-assembly.

20. An integrated method of claim 19 further including the step of providing fluid communication between a dispense chamber of the dispense pump sub-assembly and a filter chamber of the filtration sub-assembly, and between the filter chamber and the atmosphere, whereby ambient pressure is established in the fluid at the dispense chamber.

21. An integrated method of claim 20 wherein ambient pressure is established at the dispense chamber between the step of directing the dispense pump sub-assembly from the fill position to a purge position and the step of directing the dispense pump sub-assembly from the purge position to the dispense position.

22. An integrated method of claim 21 further including the step of moving the dispense pump sub-assembly from the dispense position toward the fill position after dispensing the desired volume of fluid in an amount sufficient to substantially prevent excess fluid from being dispensed.

* * * * *